May 7, 1968
J. D. SANDERS
3,381,984
CONNECTOR
Filed March 10, 1966
4 Sheets-Sheet 1
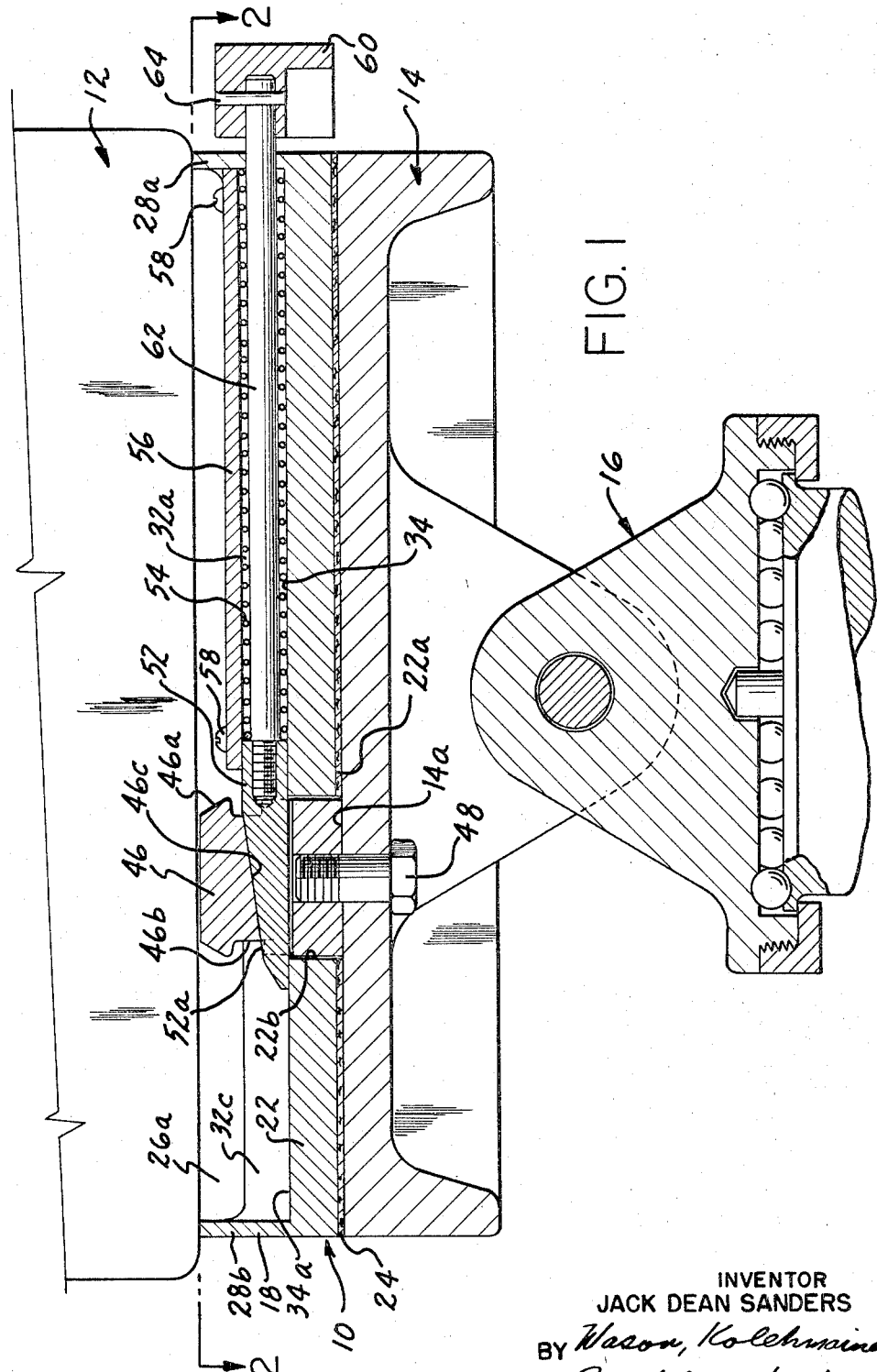
FIG. I
INVENTOR
JACK DEAN SANDERS
BY Wason, Kolehmainen,
Rathburn & Wyss.
ATTORNEYS

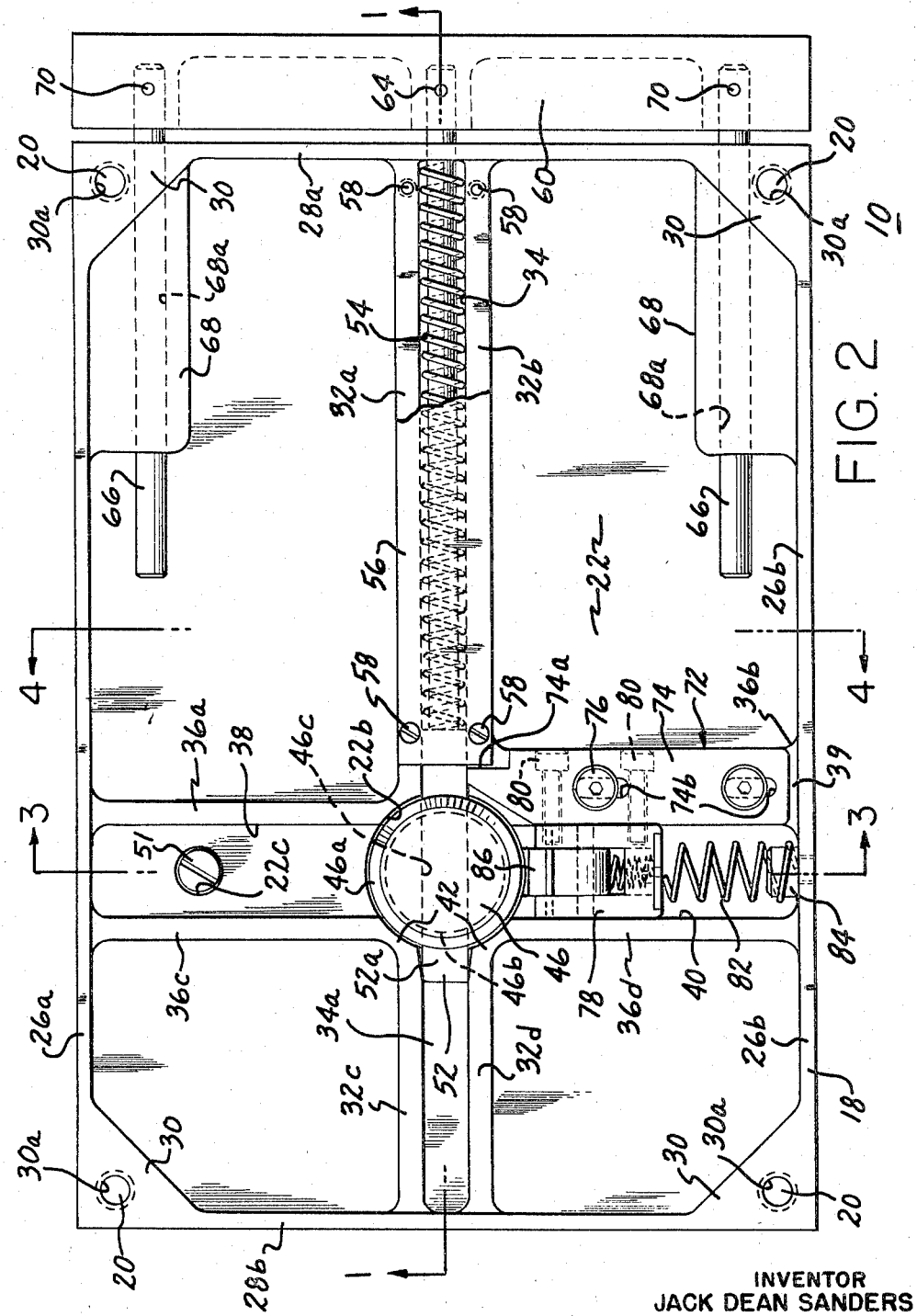

May 7, 1968  J. D. SANDERS  3,381,984
CONNECTOR

Filed March 10, 1966  4 Sheets-Sheet 3

INVENTOR
JACK DEAN SANDERS
BY Wason, Kolehmainen,
Rathburn & Wyss.

ATTORNEYS

INVENTOR
JACK DEAN SANDERS

ATTORNEYS

United States Patent Office 3,381,984
Patented May 7, 1968

3,381,984
CONNECTOR
Jack D. Sanders, Bloomington, Ind., assignor to Sarkes Tarzian, Inc., Bloomington, Ind., a corporation of Indiana
Filed Mar. 10, 1966, Ser. No. 533,305
6 Claims. (Cl. 287—20)

ABSTRACT OF THE DISCLOSURE

A connector for positively securing a TV camera upon a platform. An anchor pin that extends from the platform is passed through a hole in the TV camera base and is engaged by a tapered locking pin. This tapered locking pin is driven through a notch in the anchor pin by a locking pin spring. Means are provided for detaining the locking pin with the locking pin spring compressed until the TV camera is placed in position, and for again detaining the locking pin with the locking pin spring compressed while the TV camera is removed from the platform.

---

The present invention relates generally to a connector for holding two members together and, more particularly, relates to a connector adapted to automatically secure a delicate instrument, such as a TV camera, or the like, to a mounting platform, such as that provided on a camera-supporting tripod or carriage.

While the ensuing description refers specifically to a connector adapted for use in securing a TV camera to the base of a camera-supporting tripod or carriage, it is to be understood that the connector of the present invention is useful in other applications, and it is intended in the appended claims to cover all such uses.

When securing delicate instruments which are relatively large and heavy, such as TV cameras and the like, to various mounting platforms on tripods or movable carriages, it is desirable to provide a connector which automatically locks the camera in place properly positioned on the platform. In addition, it is desirable to provide a connector which is simple in construction, easy to operate, light in weight, small in size, and capable of firmly and positively holding the camera in place even during rapid movement and acceleration of the platform or camera carriage. The connector should be foolproof in operation to the extent that the camera cannot be inadvertently or accidentally disconnected or released. However, when it is necessary to remove or dismount the camera from the platform, the connector should be capable of permitting an easy and rapid disconnection to be effected by the operator.

It is therefore an important object of the present invention to provide a new and improved connector for holding two members together, which accomplishes the requirements set forth above.

More specifically, it is an object of the present invention to provide a new and improved connector assembly for positively securing an instrument, such as a TV camera and the like, to the mounting platform of a tripod or camera carriage.

Another object of the present invention is to provide a new and improved connector which is automatically actuated to a securely locked position upon proper positioning of the TV camera on the mounting platform.

Still another object of the present invention is to provide a new and improved connector for securing a TV camera on a mounting platform, which connector is easily released to permit removal of the TV camera from the platform.

A further object of the present invention is the provision of a connector for securing a TV camera, or the like, upon a mounting platform, which connector is foolproof in operation and will not permit the camera and mounting platform to be disconnected inadvertently or accidentally.

Yet another object of the present invention is the provision of a connector for securing a TV camera on a platform, which connector is easily reset in a position adapted for receiving a camera or the like.

For a better understanding of the invention, reference should be had to the following detailed description, taken in conjunction with the drawings, in which:

FIG. 1 is a sectional view through a connector constructed in accordance with the invention, showing the connector in a locked operating position positively securing a TV camera on a mounting platform;

FIG. 2 is a horizontal sectional view taken substantially along line 2—2 of FIG. 1;

Figure 2A:
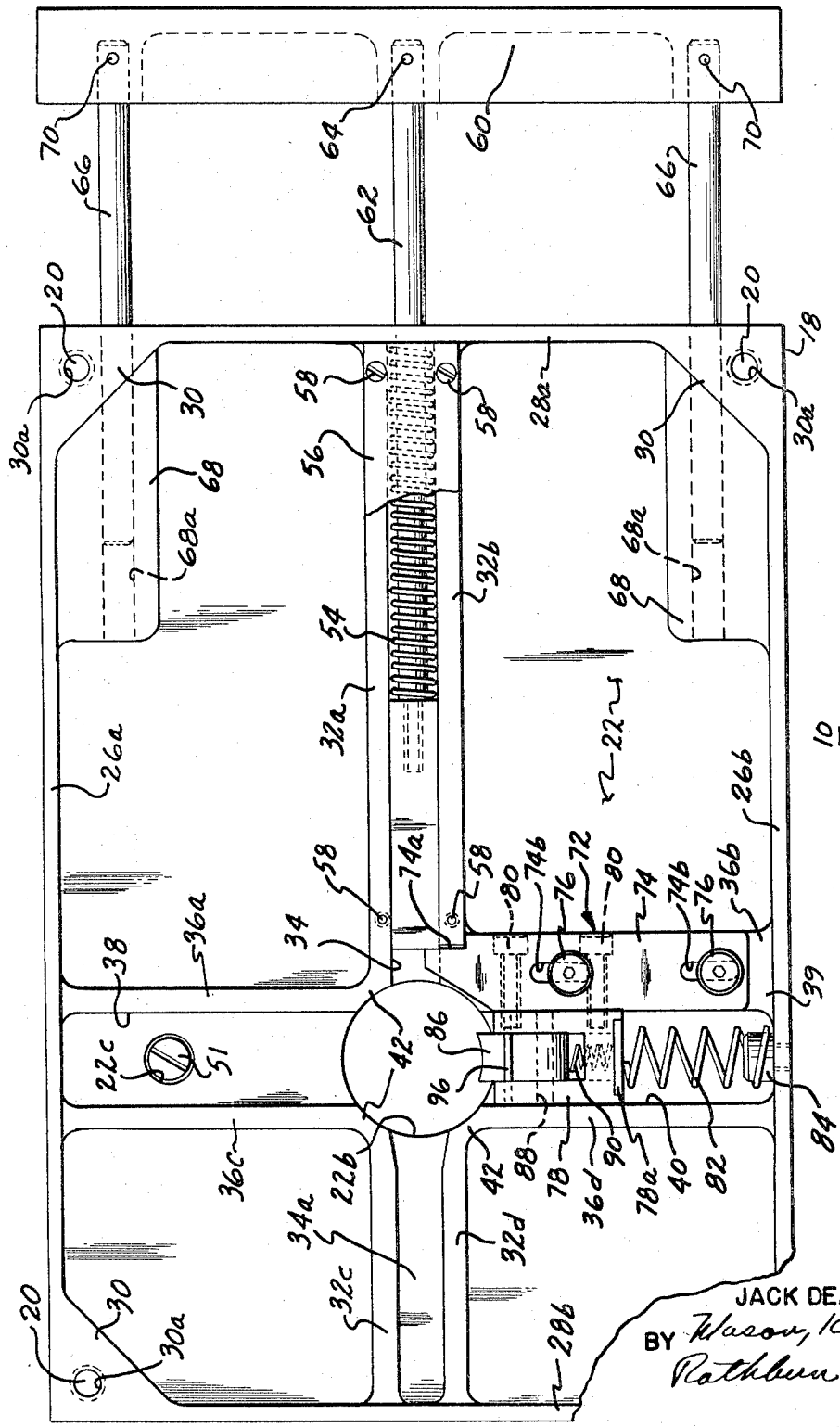
FIG. 2a is a view similar to FIG. 2 but showing the connector of FIG. 1 in an unlocked position.

The foregoing and other objects and advantages of the present invention are accomplished by the provision of a connector for positively securing a TV camera upon a supporting platform. The connector includes a body secured to one of the members, such as the camera, and the body includes a surface adapted to abut a facing surface of the other member or mounting platform. An upstanding anchor pin is permanently mounted on the platform and the anchor pin is formed with a recess or slot therethrough spaced above and generally parallel with the surface of the platform. The connector body includes socket defining means for receiving the anchor pin when the camera is mounted on the platform, and a locking gently tapered pin is provided on the body member for movement between an engaged or locked position extending through the slot in the anchor pin and a retracted position clear of the socket to permit the camera to be dismounted from the platform. The tapered locking pin is forced through the slot in the anchor pin by a spring. The taper causes the locking pin to act as a wedge, thereby insuring a tight connection even with anchor pins of varying sizes. A latching assembly is mounted on the body member for maintaining the locking pin in a retracted position and the assembly includes means responsive to the movement of the anchor pin into the socket which automatically releases the locking pin for movement into the recess of the anchor pin and positively locking the camera in position on the platform.

Referring now, more specifically, to the drawings, there is illustrated a connector, referred to generally by the numeral 10, adapted for positively securing a large, relatively heavy, delicate instrument, such as a TV camera 12 on a supporting platform 14 of a tripod, movable carriage or dolly 16. The connector 10 includes a rectangular body 18 preferably formed by casting and adapted to be permanently secured to the underside of the camera 12 by a plurality of bolts 20 located adjacent the corners of the body (FIG. 2). The body is channel shaped in cross section and includes a bottom wall 22 having a planar lower surface 22a upon which is glued a cushioning layer of cork or felt 24. The planar, lower surface of the body is adapted to abut the rest upon the upper surface 14a of the mounting platform 14 when the camera 12 is mounted on the platform.

The body 18 includes a pair of integrally formed, longitudinal, outer sidewalls 26a and 26b, and a pair of outer end walls 28a and 28b. The outer end and sidewalls of the body are integrally joined at the corners of the body with enlarged, triangularly shaped, stiffening gussets 30 (FIG. 2) having apertures 30a for receiving the mounting screws 20, which secure the body 18 to the underside of the camera 12 and extend upwardly through the apertures into the bottom thereof.

Figure 4:
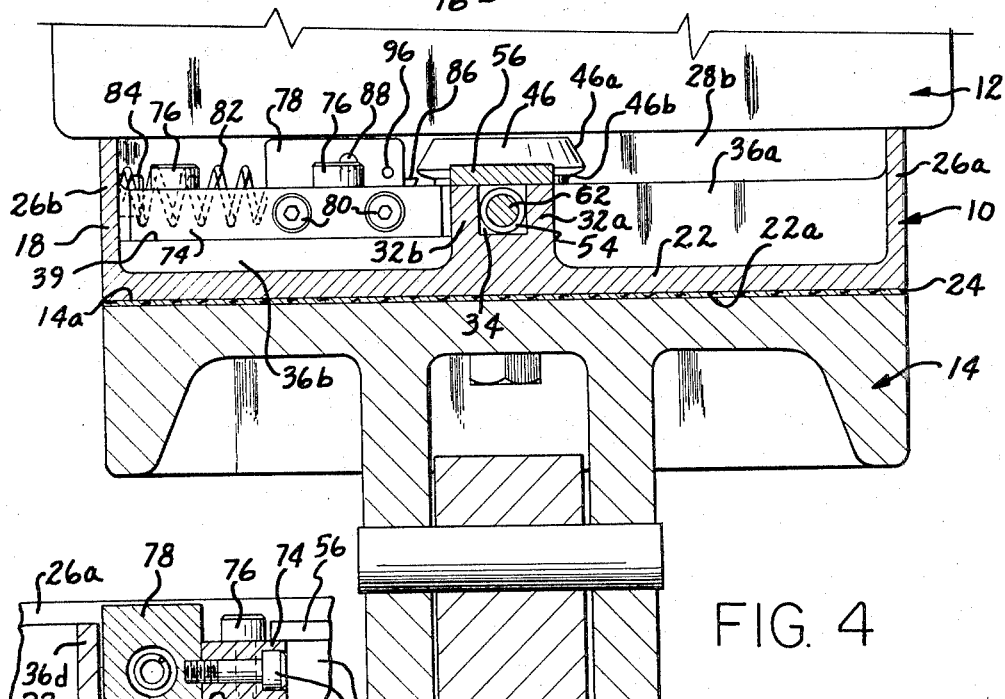
FIG. 4 is a transverse sectional view taken along the line 4—4 of FIG. 2.

The body 18 also includes a pair of inner, longitudinally extending ribs 32a and 32b which are parallel with the outer sidewalls 26a and 26b and are spaced from one another on opposite sides of the longitudinal center line of the body to provide a central channel 34 therebetween (FIG. 4). The ribs 32a and 32b extend inwardly toward the central portion of the body from the end wall 28a and another pair of ribs 32c and 32d aligned with the ribs 32a and 32b, respectively, are formed to extend inwardly toward the central portion of the body from the opposite end wall 28b. These ribs are spaced apart, forming a channel 34a therebetween in alignment with the channel 34. In addition to the longitudinal inner ribs, the body is formed with a pair of transversely extending, parallel ribs 36a and 36c which extend inwardly from the sidewall 26a to join the inner ends of the longitudinal ribs 32a and 32c, respectively, and an open space or channel 38 is defined between these transverse ribs which intersects transversely the channels 34 and 34a. Another pair of parallel transverse ribs 36b and 36d are formed to extend inwardly from the sidewall 26b and intersect the inner ends of the longitudinal ribs 32b and 32d, respectively. The rib 36b is somewhat wider and shorter in height than its opposing parallel rib 36d and between these ribs is formed a channel or slideway 40 in line with the channel 38 which intersects transversely the channels 34 and 34a.

In the area or region adjacent the intersection or convergence of the channels 34, 34a, 38, and 40, a circular opening or socket 22b is formed in the bottom wall 22 and the intersecting pairs of ribs 32a, 36a, 32c, 36c, and 32d, 36d provide wall segments 42 for the socket which extend upwardly into the body 18 from the bottom wall. The rib 36b is relatively wide and thin in contrast with the other ribs and includes a flat upper surface or way 39 which forms a slideway for an automatic latching mechanism to be described in detail hereinafter. A portion of the rib 32b adjacent the socket 22b is cut away to permit the slideway surface 39 to extend inwardly into an area diametrically opposed to the wall segment 42 formed by the intersecting ribs 32c and 36c and adjacent the socket opening 22b in the bottom wall.

In order to interconnect the platform 14 and the connector body 18, when the camera 12 is placed in position or mounted on the platform 14, the connector 10 includes an upstanding anchor pin 46 mounted to extend upwardly from the upper surface 14a of the platform for engagement with the body 18. The anchor pin 46 is held in place by a mounting bolt 48 which extends upwardly through the platform into the pin and an eccentrically located pin 50 is provided to key the anchor pin and platform together and prevent rotation of the anchor pin about the vertical axis of the mounting bolt. The anchor pin 46 is formed with a beveled, annular camming surface 46a adjacent its upper end and an inwardly extending annular slot or recess 46b (FIG. 3) is provided in the pin body below the upper camming surface. A slot 46c extending transversely through the body of the anchor pin is provided in order to receive a transversely movable locking pin for securing the body 18 and anchor pin tightly together. When the camera 12 and body are lowered onto the platform 14, the anchor pin 46 protrudes upwardly into the interior body through the opening 22b in the bottom wall. In order to prevent relative rotation of the camera and body on the mounting platform 14, a pin 51 is permanently mounted on the platform 14 to keep the platform and body together. The pin 51 extends upwardly from the upper surface 14a of the platform into an opening 22c in the bottom wall 22 located off center of the socket 22b in the channel 38. When the camera 12 and attached connector body 18 is to be mounted on the platform 14, it is necessary to center the socket 22b with the anchor pin 46 and, also to center the opening 22c with the pin 51. After this centering is accomplished, the camera and connector body can be lowered into place on the platform 14, as shown in FIGS. 1, 2, and 3 and proper alignment is assured.

As best shown in FIG. 1, the transversely extending recess 46c formed in anchor pin 46 has an upper surface which slopes in relation to the upper platform surface 14a and, in order to lock the body 18 and platform 14 together, a transversely movable locking pin 52 is mounted on the body for sliding movement within the channel 34. The locking pin 52 is biased toward the socket opening 22b by means of a coiled compression spring 54 positioned in the channel 34 between the end wall 28a and the outer end of the locking pin. A cover plate 56 is secured to the upper edges of the ribs 32a and 32b by a plurality of screws 58 to form a top wall overlying the channel 34 so that the spring 54 and locking pin 52 cannot move upwardly away from the upper surface of the bottom wall 22. The locking pin 52 is formed with a flat lower surface for sliding along the upper surface of the bottom wall and includes a sloping upper surface 52a (FIG. 1) adapted to cammingly engage the sloped upper surface in the anchor pin recess 46c. As the locking pin 52 moves into the recess 46c (FIG. 1) the body 18 and platform are securely held together and cannot be separated until the pin 52 is retracted from the recess.

In order to retract the locking pin from the anchor pin recess 46c, a handle 60 is conveniently provided adjacent one end of the body 18. The handle 60 is connected to the locking pin by a rod 62 threadedly connected to the outer end of the locking pin, and coaxially aligned with the spring 54. The rod 62 extends outwardly from the body 18 through an opening in the end wall 28a and the handle 60 is connected to the outer end of the rod by a pin 64. The handle is supported for horizontal sliding movement between an engaged position (FIG. 1) and a retracted position (FIG. 2a) and a pair of parallel, support rods 66 are secured to the handle by pins 70. The support rods 66 extend inwardly from the handle into the body 18 through openings in the end wall 28a and the rods are slidably received within bores 68a which are drilled in a pair of enlarged bosses 68.

Figure 3:
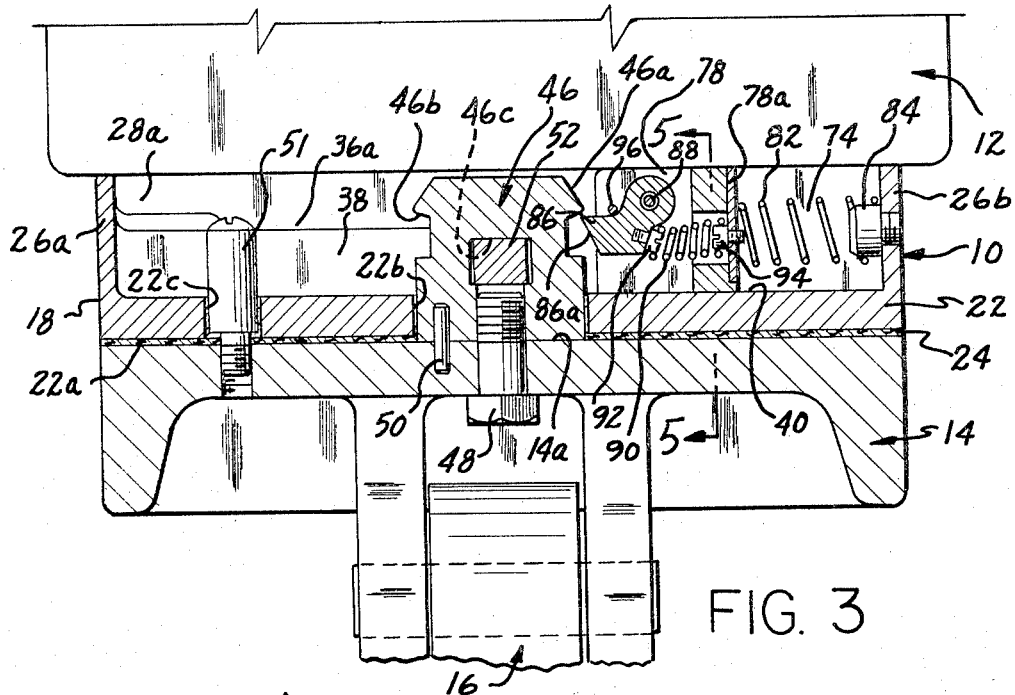
FIG. 3 is a transverse sectional view taken substantially along the line 3—3 of FIG. 2.

In order to maintain the locking pin 52 in a retracted position, once it has been retracted from engagement with the anchor pin 46 (as illustrated in FIG. 2), the connector 10 is provided with a latching assembly 72 which includes a transversely movable latch member 74 mounted to slide on the surface or way 39 of the rib 36b. The latch member 74 is formed with a notched recess 74a adjacent its tip for engaging the end of the locking pin 52 (FIG. 2a), to hold the locking pin in a retracted position against the force of the spring 54. A pair of longitudinal slots 74b are provided in the latch member 70 to accommodate a pair of retaining bolts 76 which extend downwardly through the slots into the rib 36b, hold the latch member against the surface 39 and yet permit transverse sliding movement thereof between the locking pin engaging position of FIG. 2 and a retracted position (FIG. 2a).

Figure 5:
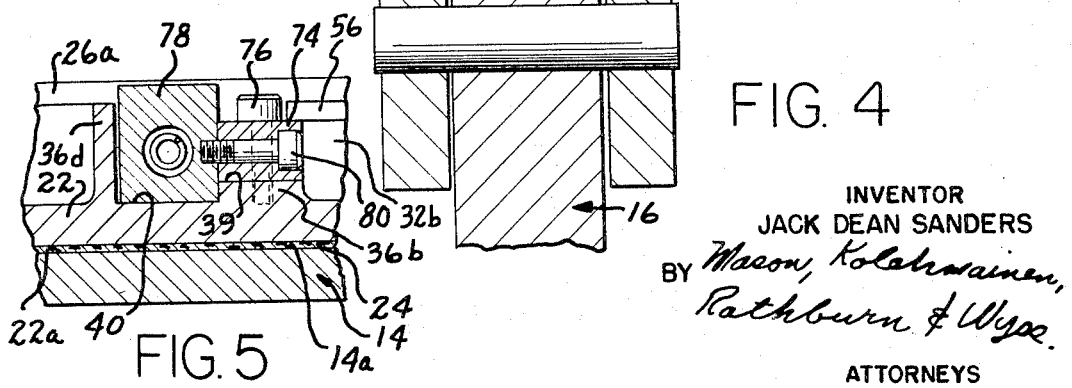
FIG. 5 is a fragmentary sectional view taken along line 5—5 of FIG. 2.

The latching assembly also includes a U-shaped cam support member 78 which is secured to one side of the latch member 74 by a pair of bolts 80 and is slidable within the channel 40 (FIG. 5) toward and away from the socket opening 22b. The cam support member and latching member 74 are biased inwardly toward the socket by a coil spring 82 having its outer end bearing against the sidewall 26b. The outer end of the spring is centered in the channel 40 by means of a button 84 secured to the sidewall 26b and the inner end of the spring bears against a backplate 78a mounted on the bight or central portion extending between the legs of the U-shaped member 78 (FIG. 3).

In order to automatically release the locking pin 52 from a retracted position when the camera 12 and connector body 18 are lowered into place on the platform 14, an anchor pin engaging cam member 86 is mounted between the legs of the U-shaped member 78 (FIG. 3). The cam member 86 is pivotally movable about a mounting pin 88 which extends between the legs of the U-shaped member 78 and is biased in a clockwise direction by means of a spring 90. One end of the spring 90 is secured to the cam member 86 by a screw 92 and the opposite end of the spring bears against the back plate 78a and is centered by a screw 94. Clockwise movement of the cam member 86 about the mounting pin 88 is positively limited by a stop pin 96 (FIG. 3) which extends between the legs of the U-shaped support member 78 while counterclockwise rotation of the cam member is yieldingly opposed by the spring 90. The cam member is formed with a sloping cam surface 86a on its forward face for engaging the anchor pin 46 as the pin extends upwardly into the socket opening 22b.

When it is desired to secure a TV camera 12 on the mounting platform 14, the handle 60 is moved outwardly to retract the locking pin 52, as shown in FIG. 2a. With the locking pin 52 retracted, the spring 82 is free to move the latch member 74 toward the opening 22a so that the recess 74a thereof engages the forward end of the locking pin 52 and holds the pin in the retracted position against the force of the bias spring 54. The locking pin 52 is positively maintained in the retracted position until the latching member 74 is moved outwardly toward the body sidewall 26b out of engagement with the forward end of the locking pin. Movement of the latching member to release the locking pin is accomplished automatically as the camera 12 and connector body 18 are lowered onto the platform 14. The camming surface 46a on the anchor pin 46 cammingly engages the cam surface 86a of the cam member as the camera is lowered onto the platform and the cam support member 78 and latch member 74 are cammed outwardly toward the sidewall 26b. The anchor pin exerts an upward force on the cam 86 as it moves into the socket but the stop pin 96 prevents clockwise rotation of the cam and because of the sloping surfaces 46a and 86a the cam and support mmeber 78 are forced outwardly toward the sidewall 26b against the force of the bias spring 82. As this occurs the latching member 74 also moves outwardly and the notch or recess 74a thereof moves out of engagement with the forward end of the locking pin 72, permitting the spring 54 to move the locking pin into the recess 46c of the anchor pin 46. As the locking pin 52 moves into the recess 46c to a fully home position (FIG. 1), the sloped upper surface 52a of the pin exerts a camming force against the upper surface of the recess 46c in the anchor pin and positively locks the anchor pin 46 and body 18 together.

When it is desired to remove or dismount the camera 12 and connector body 18 from the mounting platform 14, the handle 60 is moved outwardly from the body to retract the locking pin 52 from the anchor pin recess 46c. When this occurs, the biasing spring 82 is free to move the latching member 74 inwardly into a latching position (FIG. 2a) wherein the forward end of the locking pin 52 is held in a retracted position by engagement with the recess 74a or notch adjacent the tip end of the latching member. The camera 12 and attached connector body 18 can now be lifted off or dismounted from the platform 14 and the locking pin 52 will remain in the retracted position until it is released automatically by a remounting of the camera on the platform. When the camera and connector body are remounted on the platform the camming surface 46a of the anchor pin again engages the camming surface 86a of the cam member 86 and moves the latching member 74 outwardly against the spring 82 to release the anchor pin 52 for automatic movement into locking position in the recess 46c of the anchor pin.

While there has been illustrated and described a single embodiment of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. A connector for holding two members together, comprising an anchor pin secured to extend outwardly from a surface of one of said members, and formed with a transversely extending recess therein, said recess extending completely through said anchor pin and including a wall surface inclined with respect to said surface of said one member, a body member secured to said other member adapted to abut said surface of said one member and including socket defining means for receiving said anchor pin, a locking pin mounted on said body and slidable between an engaged position extending into said socket means for engagement with the recess of said anchor pin and a retracted position clear of said socket means, said locking pin including a wedging surface thereon adapted to engage the wall surface in said recess when in an engaged position and forceably hold said members together, and latch means for normally maintaining said locking pin in said retracted position and including means responsive to the movement of said anchor pin into said socket means for releasing said locking pin to move to said engaged position into the recess of said anchor pin and hold said members together.

2. The connector of claim 1 including biasing means urging said locking pin toward said engaged position and handle means for moving said locking pin against said biasing means to said retracted position.

3. The connector of claim 1 wherein said anchor pin includes a camming surface thereon adapted to engage and release said latch means when said anchor pin enters said socket means.

4. The connector of claim 1 wherein said latching means includes means responsive to the movement of said locking pin to said retracted position to maintain said locking pin in said retracted position.

5. The connector of claim 1 wherein said latch means is biased into a latching position for holding said locking pin in a retracted position and is movable to an unlatched position by engagement with said anchor pin inserted into said socket means.

6. The connector of claim 5 wherein said latch means includes a pivotally mounted dog engageable with said anchor pin upon insertion thereof into said socket means, said dog operable upon insertion of said anchor pin to move said latch means to an unlatched position from a latched position and ineffective to move said latch means from a latched position upon engagement with said anchor pin during withdrawal from said socket means.

References Cited

UNITED STATES PATENTS

| | | | |
|---|---|---|---|
| 2,166,722 | 7/1939 | Kirksey | 298—20 |
| 2,553,959 | 5/1951 | Cook et al. | 298—20 |
| 2,614,871 | 10/1952 | Grizzard et al. | 287—23 |
| 3,013,517 | 12/1961 | Isham | 280—508 |
| 3,020,066 | 2/1962 | Torrey | 280—510 |
| 3,081,115 | 3/1963 | Dickey et al. | 287—20 |

EDWARD C. ALLEN, *Primary Examiner.*

CARL W. TOMLIN, *Examiner.*

W. L. SHEDD, *Assistant Examiner.*